United States Patent [19]

Takahashi

[11] 4,061,300
[45] Dec. 6, 1977

[54] APPARATUS FOR STOPPING AND RELEASING THE MOVEMENT OF A SLIDING UP-AND-DOWN POLE OF A PORTABLE MOTION PICTURE SCREEN STAND

[76] Inventor: Sasuke Takahashi, 11-34, Yasunakacho-6-Chome, Yao, Osaka, Japan

[21] Appl. No.: 756,420

[22] Filed: Jan. 3, 1977

[30] Foreign Application Priority Data

Oct. 14, 1976 Japan .............................. 51-123567

[51] Int. Cl.² ............................................. F16M 11/38
[52] U.S. Cl. .................................. 248/125; 248/404; 248/171
[58] Field of Search ............... 248/161, 404, 157, 422, 248/125, 171, 170, 333, 336, 337

[56] References Cited

U.S. PATENT DOCUMENTS

| 619,047 | 2/1899 | Mayer | 248/404 |
| 1,725,329 | 8/1929 | Blandford | 248/404 |
| 2,659,559 | 11/1953 | Dumais | 248/171 |
| 2,945,663 | 7/1960 | Stevens | 248/170 |
| 3,282,545 | 11/1966 | Bieschke | 248/125 |

FOREIGN PATENT DOCUMENTS

| 257,146 | 2/1913 | Germany | 248/161 |
| 104,240 | 4/1942 | Sweden | 248/161 |
| 165,076 | 1/1934 | Switzerland | 248/161 |
| 638,392 | 6/1950 | United Kingdom | 248/161 |

Primary Examiner—Marion Parsons, Jr.
Attorney, Agent, or Firm—Wenderoth, Lind & Ponack

[57] ABSTRACT

An apparatus for raising and lowering a windable, portable motion picture screen which has a sliding pole inserted into a vertical opening within a hollow support cylinder in such a way that the sliding pole can slide up and down within the cylinder. A lever member is provided on the upper portion of the supporting cylinder to force against the sliding pole within the cylinder and hold it in position. The sliding pole is provided with a rack portion on one side thereof and rack and pinion gear drive means are connected to the side of the supporting cylinder in such a manner that they engage the rack portion of the sliding pole to move it up and down within the supporting cylinder as the gears are rotated.

1 Claim, 5 Drawing Figures

APPARATUS FOR STOPPING AND RELEASING THE MOVEMENT OF A SLIDING UP-AND-DOWN POLE OF A PORTABLE MOTION PICTURE SCREEN STAND

BACKGROUND AND SUMMARY OF THE INVENTION

The present invention is related to an apparatus for stopping and releasing the movement of a sliding up-and-down pole of a portable motion picture screen stand which makes it possible to carry out smooth operation of the sliding pole designed to go up and down inside the hollow supporting cylinder of a portable motion picture screen stand with a tripod, by turning linked gears mounted on the supporting plates fixed to an appropriate part of the hollow supporting cylinder, and which also makes it possible to hold the sliding pole at an optional position on its way up or down by a hooking device and to stop the turning of the linked gears.

Conventional apparatuses for stopping and releasing the movement of a sliding up-and-down pole of a portable motion picture screen stand have disadvantages; their devices for adjusting the position of the sliding pole optionally against the hollow supporting cylinder is complicated or the up and down movement of the sliding pole is operated by the turning of only one gear and, accordingly, much labour is required for operation.

The present invention has improved the abovementioned disadvantages and, moreover, has made it possible by a simple mechaism to let the sliding pole go up and down smoothly inside the hollow supporting cylinder in accordance with the stopping and releasing operation of the sliding pole at an optional position against the hollow supporting cylinder.

BRIEF DESCRIPTION OF THE DRAWINGS

The abovementioned objects and advantages of the present invention will be explained further in detail in the following with reference to the attached drawings. The invention will now be described with particular reference to the accompanying drawings, wherein.

DETAILED DESCRIPTION OF THE INVENTION

Figure 4:
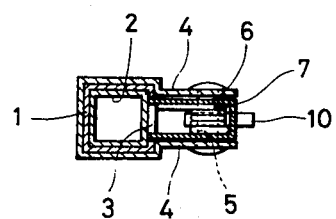
FIG. 4 is a horizontal sectional view of the stopping device provided on the upper end of the hollow supporting cylinder 1.
Figure 5:
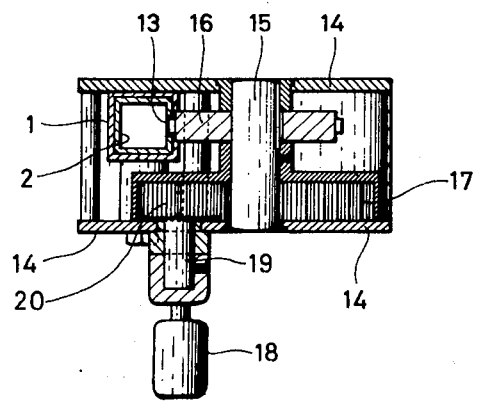
FIG. 5 is a horizontal sectional view along A—A line of FIG. 3.
Figure 1:
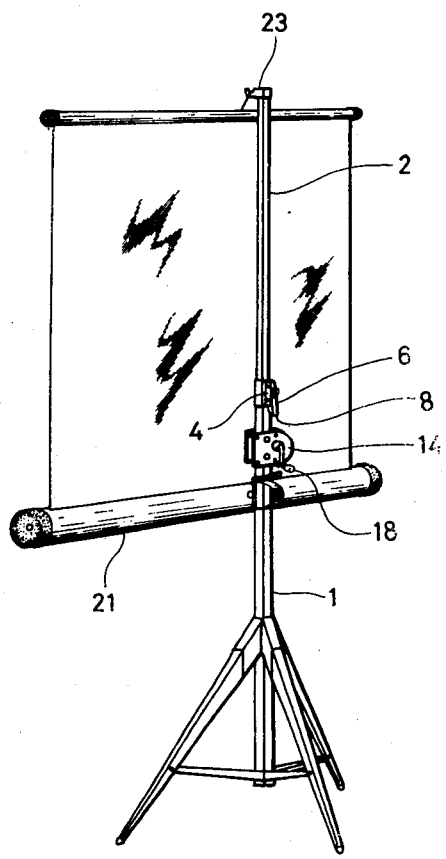
FIG. 1 is an oblique view of a portable motion picture screen stand manufactured in accordance with the present invention.
Figure 2:
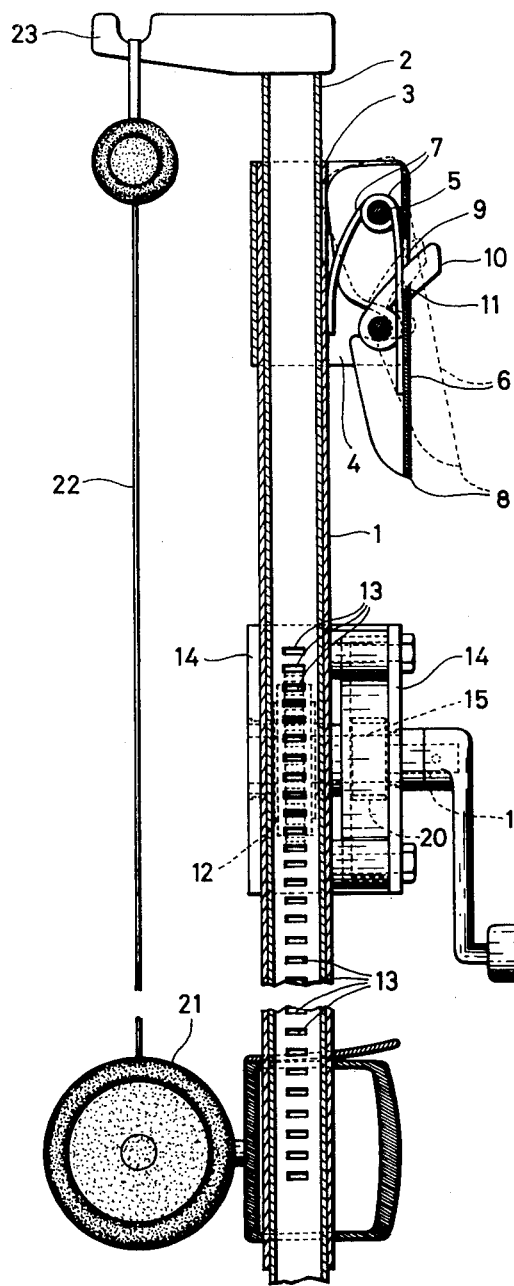
FIG. 2 is a magnified vertical sectional view to show an important part of the apparatus of the present invention.
Figure 3:
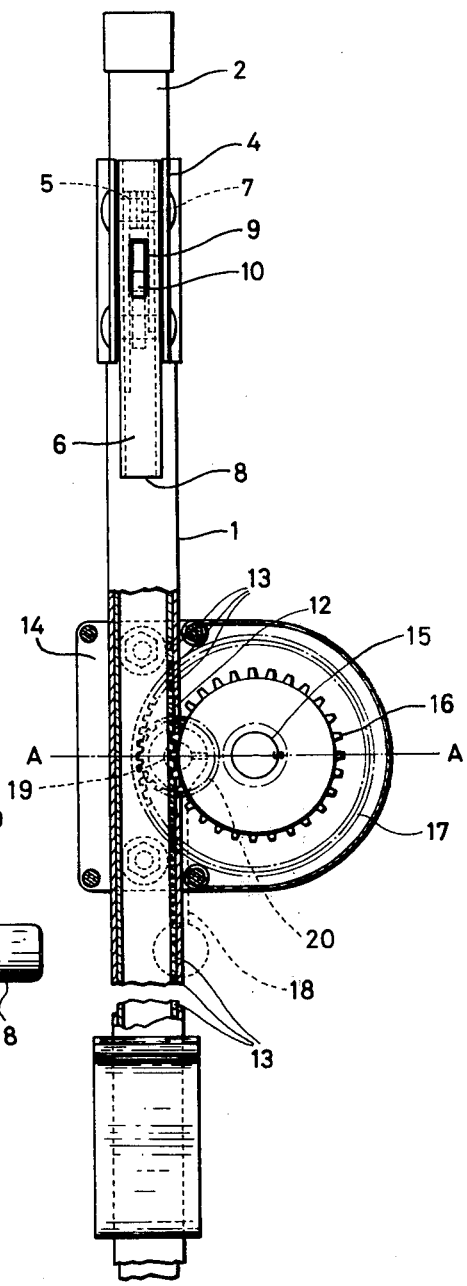
FIG. 3 is a front view in which some parts are shown in a vertical section.

A sliding pole 2 is inserted into a vertical hole at the top of a hollow supporting cylinder 1 in such way as it can go up and down therein. A supporting device 4 is mounted onto a broken-off part 3 formed on a side of the upper end of the hollow supporting cylinder 1. A lever 6 is hingedly mounted onto the supporting device 4 by a shaft 5. The lower end 8 of the lever 6 projects from the side of the hollow supporting cylinder 1, while the inner side of the upper end of the lever 6 presses against the side of the sliding pole 2 in such way as to fix the sliding pole 2 in the hollow supporting cylinder 1. A spring clip 7 surrounding the shaft 5 continuously forces the lower end of the lever 6 away from side of the supporting device 4. When a hooking part 11 of a hook 10, which projects through a hook hole 9 in the middle of the back of the lever 6, engages the lever 6, the inner side of the upper end of the lever 6 disconnects from the side of the sliding pole 2 and thus the sliding pole 2 can go up and down freely.

A second broken-off part 12 is formed at an appropriate part of the hollow supporting cylinder 1 and a rack 13 is provided on the side of the sliding pole 2 which is disposed at this second broken-off part 12. A shaft 15 is mounted on supporting plates 14, 14 which are respectively fixed to the hollow supporting cylinder 1. A pinion 16 with an external gear is connected to the shaft 15 and engages the rack 13, while an internal gear 17 mounted on the shaft 15 engages a gear 20 of a shaft 19 which has a handle 18. When the handle 18 is turned, both the gear 20 and the internal gear 17 turn together and accordingly the shaft 15 is turned, whereby the pinion 16 on the shaft 15 moves the rack 13, and the sliding pole 2 goes up and down smoothly inside the hollow supporting cylinder 1. Thus, the present invention has such advantage as it is possible to extend and rewind a motion picture screen very easily by a simple operation.

In the drawings, 21 is a case with a spring for automatic winding up of a motion picture screen 22, 23 is a screen hook, which is provided on the upper end of the sliding pole 2. It is of course possible to make any change in design so far as such change does not deviate from the spirit of the present invention.

What I claim is:

1. An apparatus for raising and lowering a windable portable motion picture screen comprising:
    hollow support stand means for supporting said motion picture screen thereon, said support stand means having an opening at the top thereof;
    support pole means positioned through said top hole of said support stand means and vertically movable therein for extending upward from said stand means and supporting said screen thereon when said screen is unwound;
    lever means mounted on said hollow support stand means and engageable with said support pole means for locking said support pole means in position within said hollow stand means, said lever means comprised of:
        a support surrounding said support stand means,
        a lever member pivotally mounted on said support and engageable with said support pole means in said support stand means, said lever having an opening therethrough,
        a hook member means pivotally mounted on said support and extending through said opening in said lever member and engageable with said lever member for locking said lever member away from said support pole means, and
        spring means surrounding said first shaft and in contact with said lever for continuously biasing said lever toward said support pole means;
    said support pole means has a geared rack portion on one side thereof; and
    rotatable rack and pinion means attached to said support stand means and operatively engaging said geared rack of said support pole means for rotating and moving said support pole means upward and downward, said rack and pinion means comprised of:

support plates mounted on said support stand means, a first shaft rotatably mounted through said support plates, a first pinion connected concentrically with said first shaft and engageable with said geared rack portion of said support pole means, an internal gear mounted concentrically with said first shaft and rotatable therewith, a second shaft rotatably mounted through at least one of said support plates, a second pinion connected concentrically with said second shaft and engaging said internal gear mounted on said first shaft, and handle means connected to said second shaft for rotating said second shaft, whereby turning said handle means causes said second shaft and second pinion to rotate and in turn rotate said internal gear engaging said second pinion, thus rotating said first shaft connected to said internal gear and in turn rotating said first pinion engaging said geared rack portion of said support pole means, thereby moving said support pole means in said hollow support stand means.

* * * * *